(12) United States Patent
Swierk et al.

(10) Patent No.: US 9,734,191 B2
(45) Date of Patent: Aug. 15, 2017

(54) ASYNCHRONOUS IMAGE REPOSITORY FUNCTIONALITY

(71) Applicant: Dell Products, L.P., Round Rock, TX (US)

(72) Inventors: Todd Swierk, Austin, TX (US); Gary Douglas Huber, Austin, TX (US); Carlton A. Andrews, Austin, TX (US); Clint H. O.Connor, Austin, TX (US); Bruce C. Bell, Round Rock, TX (US); David Konetski, Austin, TX (US); Clifton J. Barker, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 177 days.

(21) Appl. No.: 14/231,678

(22) Filed: Mar. 31, 2014

(65) Prior Publication Data

US 2015/0278293 A1  Oct. 1, 2015

(51) Int. Cl.
*G06F 17/30* (2006.01)
*G06F 21/56* (2013.01)

(52) U.S. Cl.
CPC .. *G06F 17/30392* (2013.01); *G06F 17/30312* (2013.01); *G06F 17/30619* (2013.01); *G06F 17/30716* (2013.01); *G06F 21/566* (2013.01); *G06F 21/568* (2013.01)

(58) Field of Classification Search
CPC .. G06F 17/30312; G06F 21/56; G06F 21/564; G06F 21/568
See application file for complete search history.

(56) References Cited

U.S. PATENT DOCUMENTS

| | | | | |
|---|---|---|---|---|
| 7,934,262 | B1* | 4/2011 | Natanzon | G06F 21/564 707/648 |
| 2005/0038818 | A1* | 2/2005 | Hooks | G06F 11/0748 |
| 2006/0095907 | A1* | 5/2006 | Barsness | G06F 11/3466 718/100 |
| 2007/0006023 | A1* | 1/2007 | Fujibayashi | G06F 11/1456 714/6.32 |
| 2007/0113062 | A1* | 5/2007 | Osburn | G06F 9/4403 713/1 |

(Continued)

OTHER PUBLICATIONS

Selix, Batch File Scripting: How to export, find and replace, and reimport a registry key (XP, Win2k3, Vista, Windows 7), 2010, http://www.tech-recipes.com/rx/5672/batch-file-scripting-how-to-export-find-and-replace-and-reimport-a-registry-key-xp-win2k3-vista-windows-7/.*

*Primary Examiner* — Khang Do
(74) *Attorney, Agent, or Firm* — Fogarty LLP

(57) ABSTRACT

Embodiments of methods for asynchronous image repository functionality are presented. In an embodiment, a method includes storing user data in a data storage device that is local to a user interface device, storing a copy of the user data to a storage location that is remote from the user interface device, performing a service for a user of the user interface device using the copy of the user data stored to the storage location, and communicating information associated with the service back to the user interface device. Additionally, the data image may be directly scanned for malicious software. In a further embodiment, the method may include providing a software inventory associated with the user data, such as software, stored in the image.

18 Claims, 10 Drawing Sheets

(56) References Cited

U.S. PATENT DOCUMENTS

| | | | | |
|---|---|---|---|---|
| 2009/0216975 A1* | 8/2009 | Halperin | G06F 9/45537 | |
| | | | 711/162 | |
| 2010/0318629 A1* | 12/2010 | Smith | G06F 21/128 | |
| | | | 709/217 | |
| 2011/0093471 A1* | 4/2011 | Brockway | G06F 17/30616 | |
| | | | 707/747 | |
| 2012/0030175 A1* | 2/2012 | Masser | G06F 11/0748 | |
| | | | 707/640 | |
| 2012/0131675 A1* | 5/2012 | Dai | G06F 21/577 | |
| | | | 726/24 | |
| 2013/0019316 A1* | 1/2013 | Kacin | G06F 21/10 | |
| | | | 726/26 | |
| 2014/0019498 A1* | 1/2014 | Cidon | G06F 17/3007 | |
| | | | 707/827 | |

* cited by examiner

ASYNCHRONOUS IMAGE REPOSITORY FUNCTIONALITY

FIELD

This disclosure relates generally to computer systems, and more specifically, to asynchronous image repository functionality.

BACKGROUND

Productivity is a primary goal of most computer users, particularly in a work environment. A computer user expects the computer to function properly at all times and to make the data stored thereon consistently available. Loss of functionality or data can be very inconvenient and frustrating, from a productivity perspective. Additionally, computer users typically install various software on the system. It may be necessary for various reasons to conduct an inventory or analysis of software installed on the computer system. This is particularly the case in business environments, where breach of software license agreements can result in company liability. Typically, processes are run on the local user's computer which analyzes the data on the local computer, most often while the user is using the computer, to provide and upload inventory and analysis reports to a central location. This can be a processing and disk intensive process, which further impacts user productivity.

One very common issue that computer users face is the potential for malicious software to disable and/or hijack their system. Often remediation of malware infections require the help of a professional to painstakingly, and often very slowly, identify and rid the system of the infection. It is often the case that the malicious software is able to bypass existing anti-virus and malware protection software running on the client system. This results in a type of problem that can be difficult to diagnose via a customer call to support. At times the solution requires the entire wiping of a system via a system restore (potentially losing customer data and/or settings), and at best it is costly to manually restore the system back to usable for the client. This is a very painful experience that unfortunately is all too common among computer users.

Completing an up to date inventory of software installed and in use across an enterprise or business on the multitude of end clients is a complicated process which is prone to issues. Most current solutions require an inventory agent to be maintained on the end point or try to work around that through the use of management interfaces. These are potentially complex solutions to deploy and maintain or result in incomplete reporting. For example, keeping track of what software site licensing by seat that is in use and staying compliant can be a time consuming task, which can dramatically impact user productivity.

In general, user productivity is a high priority among computer users. Thus, any maintenance, compliance, inventory, or auditing processes that need to be conducted on the computer can be problematic, because such processes can consume valuable system resources, or render the computing device unavailable to the user for periods of time. These processes can negatively affect user productivity.

SUMMARY

Embodiments of methods for asynchronous image repository functionality are presented. In an embodiment, a method includes storing user data in a data storage device that is local to a user interface device, storing a copy of the user data to a storage location that is remote from the user interface device, performing a service for a user of the user interface device using the copy of the user data stored to the storage location, and communicating information associated with the service back to the user interface device. As used herein, the term "user data" means data, files, code, executables, applications, or any other computer processes that generate or manipulated data on a computer system. Storage of the "user data" may be in the form of backup copies of data, files, applications, and other forms of user data, images of hard disk drives, or the like. The terms "user data," "data," and image are used interchangeably throughout this specification.

In an embodiment, the service includes performing a centralized data mining service for a user of the user interface device or the supervisory information technology department. The data mining service may include a software inventory service configured to centrally analyze software installed on the user interface device and to provide information regarding compliance with a software licenses or policies. The data mining service may also include centralized inspection of user browser history. In another embodiment, the data mining service comprises centralized identification of documents to be retained for legal compliance. In still another embodiment, the data mining service comprises centralized indexing of documents for searching across a plurality of user interface devices.

In another embodiment, the service is a centralized data protection service for discovering malicious software installed on the user interface device. In such an embodiment, the method may include notifying the user interface device that malicious software has been installed on the user interface device. Such methods may also include facilitating removal or remediation of an infection of malicious software on the user interface device from the image stored to the storage location.

In another embodiment, the service is a centralized data rollback service for maintaining a plurality of user data states, each user data state providing a restore point for restoring user data on the user interface device. The method may also include facilitating remediation of performance degradation of the user interface device using the copy of the user data stored to the storage location.

Embodiments of Information Handling Systems (IHS) configured for asynchronous image repository functionality are also presented. In an embodiment, the IHS includes a processor, and a memory coupled to the processor, the memory including program instructions stored thereon that, upon execution by the processor, cause the IHS to: (1) store user data or a full system image in a data storage device that is local to a user interface device; (2) store a copy of the user data, such as a system image, to a storage location that is remote from the user interface device; and (3) receive information associated with a service performed centrally using the copy of the user data stored to the storage location.

Embodiments of systems for asynchronous image repository functionality are also presented. In an embodiment, the system includes a user interface device configured to store user data in a data storage device that is local to the user interface device, and store a copy of the user data to a storage location that is remote from the user interface device. The system may also include a storage location in data communication with the user interface device, the storage location configured to perform a service for a user of the user interface device using the copy of the user data stored to the storage location, and communicate information associated with the service back to the user interface device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present embodiments describe systems and methods for performing various maintenance, inventory, auditing, or other processes or services on a computing device in a manner that reduced impact on user productivity. Such embodiments utilize a data image repository, where data is stored remotely from the computing device. Various services or processes can be performed on the data stored in the data image repository, and then the computing device can be updated to reflect any changes that may have occurred during the process or service without dramatically impacting user productivity.

Figure 1:
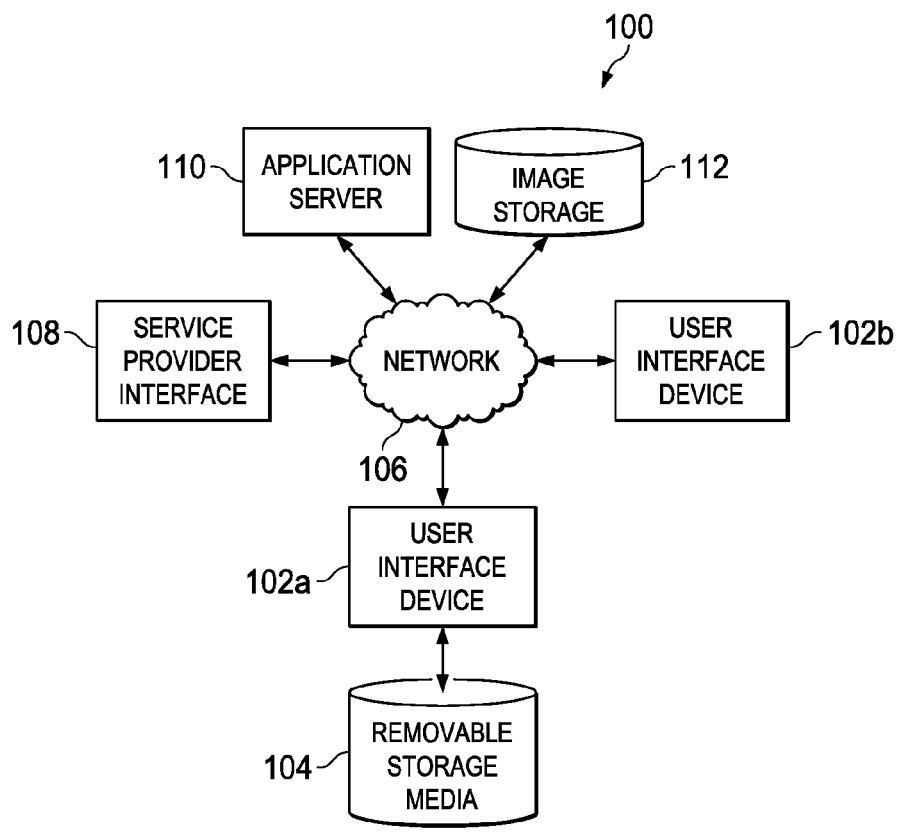
FIG. 1 is a diagram illustrating one embodiment of a system for asynchronous image repository functionality.

FIG. 1 is a diagram illustrating one embodiment of a system 100 for asynchronous image repository functionality. In an embodiment, the system 100 includes one or more user interface devices 102a-b. The user interface devices 102a-b may be computing devices, such as desktop computers, laptop computers, tablet computing devices, mobile computing devices, etc.

In other embodiments, the user interface devices may include or be coupled to servers, networking devices, security appliances, or the like. In still other embodiments, the user interfaces may be of diverse types. For example, a first user interface device 102a may be a desktop workstation, and a second user interface device 102b may be a mobile computing device or a tablet computing device. In certain embodiments, aspects of the first user interface device 102a may be tied or related to aspects of the second user interface device 102b. For example, a selection of a user's files, accounts, configuration, applications, etc. may be shared between the first user interface device 102a and the second user interface device 102b. One of ordinary skill will recognize a variety of user interface devices 102a-b that may be configured according to the present embodiments.

In an embodiment, the system 100 may include a removable storage medium 104 which may store information used by the user interface device 102a. Examples of removable storage media 104 include flash memory drives, Secure Digital (SD) cards, optical storage disks, external magnetic disk drives, external Solid State Drives (SSD), etc. In an embodiment, the removable storage media 104 may communicate with the user interface device 102a through a data communication port, such as a Universal Serial Bus (USB) port, or the like. Alternatively, the removable storage media 104 may communicate with the user interface device 102a wirelessly through, e.g., a WiFi or Bluetooth communication interface.

User interface devices 102a-b may be configured to communicate via an interface to network 106. Network 106 may include a Local Area Network (LAN), a Wide Area Network (WAN) connection, a connection to the Internet, etc. The network 106 may include various components, such as network routing devices, network switching devices, network hubs, network firewalls, wireless access points, mobile data connections, telecommunications network backbone hardware, etc. In various embodiments, the network 106 may be configured to receive communication requests from the user interface devices 102a-b and transmit responses from other devices connected to the network 106 back to the user interface devices 102a-b.

In an embodiment, the system 100 may include one or more devices or subsystems which may be provided to service the user interface devices 102a-b. For example, service provider interface 108 may be provided to allow a service provider to communicate with the user interface device 102a. In one example, embodiment, the service provider may be a technical support technician. The technical support technician may establish a user support session, such as a chat session with a user of the user interface device 102a, b. The user support session may additionally include a remote access session, a file transfer session, a voice or video connection, etc. In an embodiment, the user support session may be requested by the user of the user interface device 102a, b. In another embodiment, the user interface device 102a, b may automatically request the user support session in response to encountering a system error.

In an embodiment, the system 100 may also include an application server 110. In such an embodiment, the application server 110 may provide the user interface devices 102a-b with access to one or more applications 110. For example, the user interface device 102a-b may operate as a thin client which displays video related to operations of an application hosted by application server 110, but does not directly handle processing of data associated with operation of the application. In a further embodiment, the user interface device 102a-b may additionally provide an interactive interface allowing the user to enter data or manipulate operation of the application. Data and commands entered by the user at the user interface device 102a, b may be communicated to application server 110 via network 106.

In one example, the application server 110 may be accessed by the user interface device 102a, b in the event of a failure being detected at the user interface device 102a. For example, in the event of a system failure of an operating system, the user interface device 102a, b may automatically switch to a fault recovery mode. In the fault recovery mode, the user interface 102a may still be used by the user to perform tasks, but the operating system may be operated on the application server 110 and the user interface device 102a may simply operate as a user interface client of the application server 110 allowing the user to enter inputs which are communicated to the application server 110 via network 106, and seeing responsive actions of the operating system on the application server 110. One of ordinary skill will recognize additional examples involving applications which may be hosted by application server 110, including word processing applications, email applications, photo editing applications, etc.

In an embodiment, image storage 112 may provide remote storage functionality for user interface device 102a. In one embodiment, the image storage 112 may store a complete image of the data stored on user interface device 102a, b. In another embodiment, the image storage 112 may store a partial image of data stored on the user interface device 102a, b. For example, a selection of files or folders stored on the user interface device 102a may be designated for storage on the image storage 112. In such an embodiment, the files or folders may be communicated to image storage 112 via network 106 for storage. In still another embodiment, incremental changes to information stored on the user interface device 102a may be communicated to image storage device 112, such that the copies of information stored on image storage 112 are synchronized with the information stored on user interface device 102a.

Figure 4:
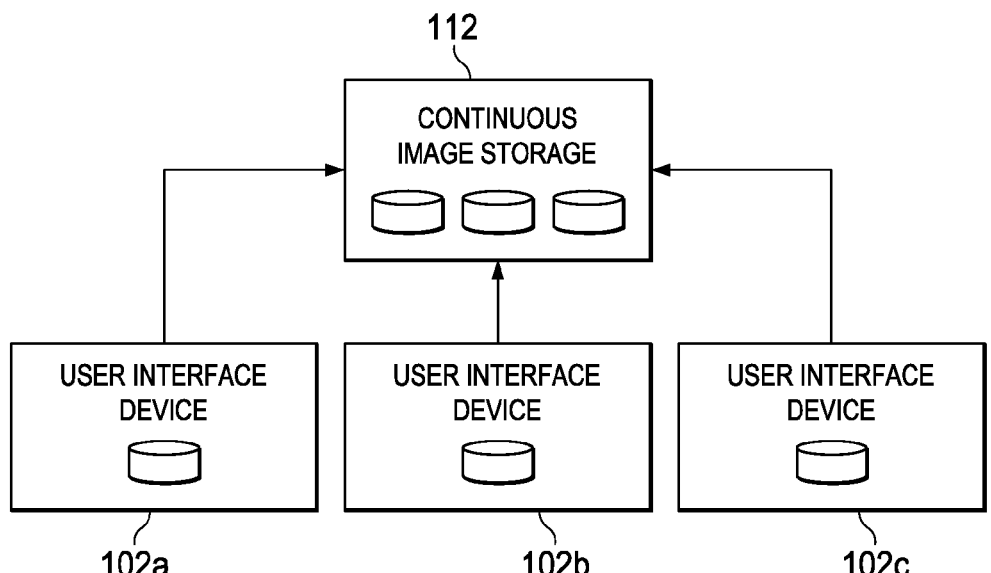
FIG. 4 is a block diagram illustrating another embodiment of a system for asynchronous image repository functionality.

The system 100 of FIG. 1 is just one example of a possible system which may be used according to the present embodiments. Certain components of system 100 may be added or omitted without substantial change to the fundamental operation of the system. For example, while it may be useful to include a removable storage media 104, this component of system 100 may be omitted in various embodiments. Similarly, a user interface device 102 may access an application server during a user support session, but this component of system 100 may also be omitted in various embodiments. Additionally, image storage 112 may be useful to a service technician during a user support session, but this component may also be omitted in various embodiments. One of ordinary skill will also recognize that certain components may be added to system 100, for example as shown in FIG. 4.

Figure 2:
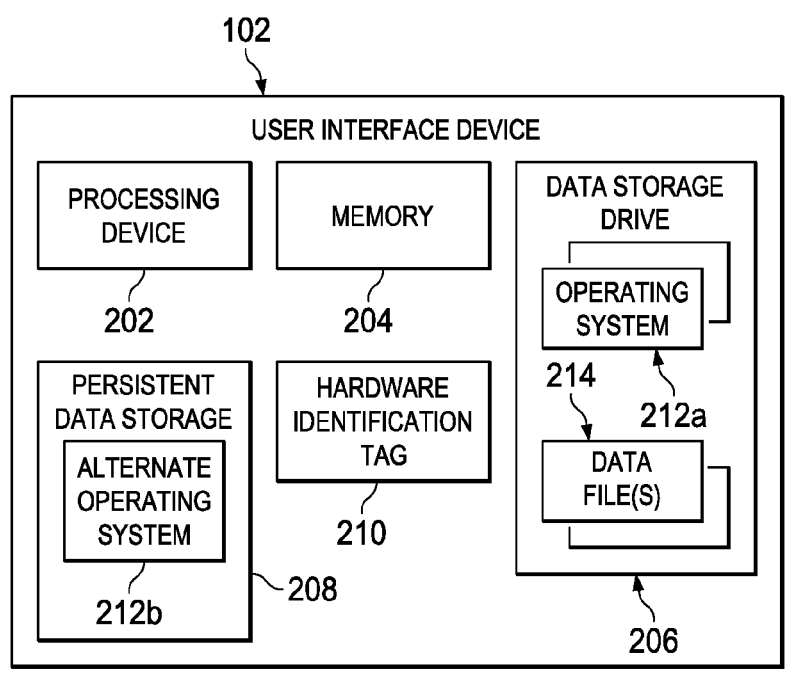
FIG. 2 is a diagram illustrating one embodiment of a user interface device configured for asynchronous image repository functionality.

FIG. 2 is a diagram illustrating one embodiment of a user interface device 102 configured for asynchronous image repository functionality. In an embodiment, the user interface device 102 may include a processing device 202, a memory 204, a data storage drive 206, a persistent data storage 208, and a unique identifier 210. In various embodiments, the unique identifier 210 may be a hardware identification tag, a system-specific service tag, etc. One of ordinary skill will recognize alternative embodiments of a user interface device 102. For example, in certain embodiments the user interface device 102 may omit certain elements described in FIG. 2, or may add certain additional elements not described in FIG. 2.

In an embodiment, the processing device 202 may execute programmed instructions stored in the memory 204 or the data storage drive 206. For example, the data storage drive may store program code associated with a first operating system 212a. Portions of the code for the first operating system 212a may be loaded by the processing device 202 into the memory 204. In an embodiment, the first operating system is a Windows® operating system available from Microsoft® Corporation. Additionally, the processing device 202 may access data files stored in either the memory 204 or the data storage drive 206. In an embodiment, a user of the user interface device 202a may access data files 214 using controls provided by the operating system 212.

In certain embodiments, one or more data files 214, or the first operating system 212a may experience a fault. Faults may include hardware malfunctions or failures or software failures. In such an embodiment, the processor 202 may access code for system recovery. In a particular embodiment, the system recovery code may cause the processor 202 to load a second operating system, such as an alternate operating system 212b.

Additionally, in various embodiments, the processing device 202 may store user data on a persistent data storage 208 for recovery in the event of a fault. In a particular embodiment, the persistent data storage device 208 may store recently accessed files. In another embodiment, the persistent data storage 208 may contain code for the alternate operating system 212b. In such an embodiment, the alternate operating system 212b may still be accessible, even if the data storage drive is inaccessible. In still other embodiments, the persistent data storage 208 may store system configuration settings, system fault logs, system status logs, etc. In a particular embodiment, the persistent data storage 208 may be non-volatile data storage, such as flash storage. In still a further embodiment, data in the persistent data storage 208 may be accessible by removable storage media 104.

Figure 3:
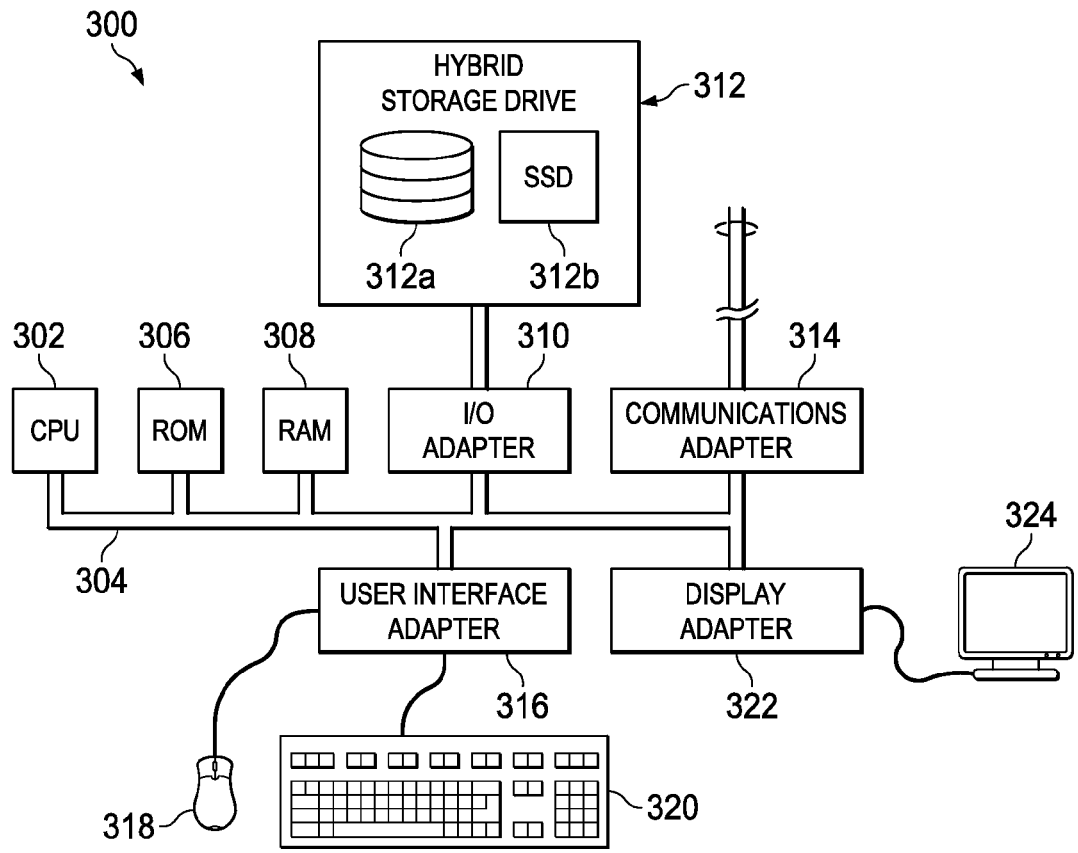
FIG. 3 is a block diagram of an example of an Information Handling System (IHS) according to some embodiments.

FIG. 3 illustrates a computer system 300 adapted according to certain embodiments of a user interface device 102a-b, the service provider interface 108, the application server 110, and/or the image server 112. The central processing unit (CPU) 302 is coupled to the system bus 304. In an embodiment, the processing device 202 may be implemented with CPU 302. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 5-13.

The computer system 300 also may include Random Access Memory (RAM) 308, which may be SRAM, DRAM, SDRAM, or the like. The computer system 300 may utilize RAM 308 to store the various data structures used by a software application configured to maintain technical support continuity across system restarts and multiple operating systems. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data. In various embodiments, memory 204 of user interface device 102 may be implemented with ROM 306 and/or RAM 308.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for interacting with operating system 212. In a further embodiment, the display adapter 322 may display a user support session, such as a chat window.

The I/O adapter 310 may connect to one or more storage devices 312, such as one or more of a hard drive, a Compact Disk (CD) drive, a floppy disk drive, a tape drive, to the computer system 300. In a particular embodiment, the storage devices 312 may be hybrid storage drives, which include both magnetic data storage disks 312a and a SSD 312b. In other embodiments, flash memory may be substituted for the SSD 312b. The SSD 312b may comprise the persistent data storage 208, which in one embodiment, may store code for the alternate operating system 212b. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, tablet computers, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

FIG. 4 is a block diagram illustrating another embodiment of a system for asynchronous image repository functionality. In the embodiment of FIG. 4, the system includes a continuous image storage device 112 which is coupled to a plurality of user interface devices 102a-c. Each user interface device 102a-c may include a local data storage device for local storage of user data, such as configuration data, data files, application code, etc. The user data stored in the local data storage device may be copied to the continuous image store 112 and an image of the user data, including application code, files, etc. may be stored thereon. The continuous image store 112 may further capture continual updates of incremental changes to the local data storage device from each of the user interface devices 102a-c over the network, and organizes those in a versioned manner where the complete image can be easily reconstructed.

Figure 5:
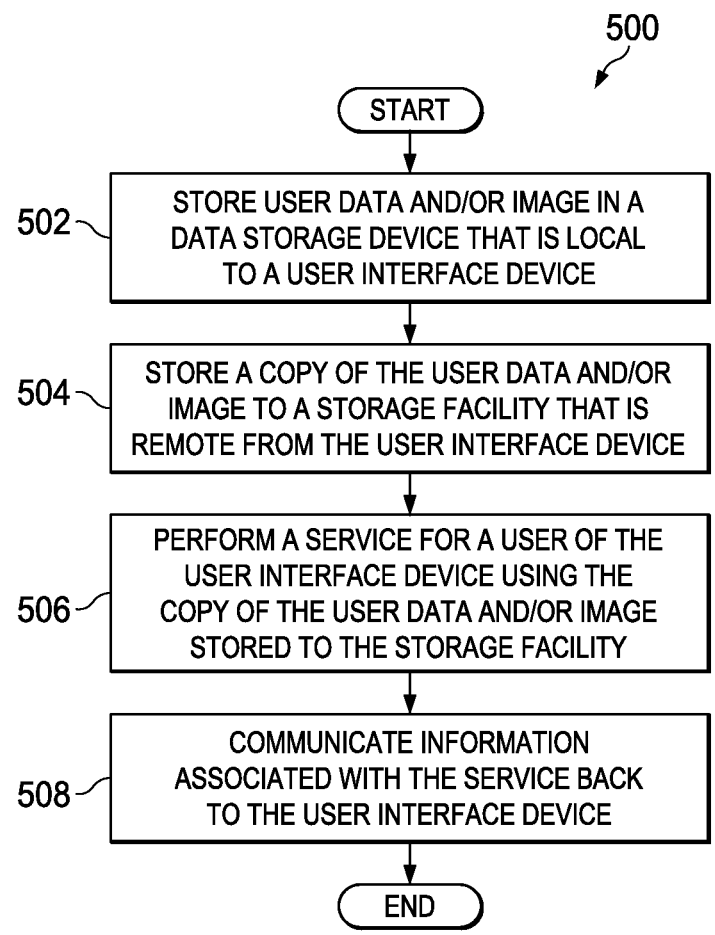
FIG. 5 is a flowchart diagram illustrating one embodiment of a method for asynchronous image repository functionality.

FIG. 5 is a flowchart diagram illustrating one embodiment of a method 500 for asynchronous image repository functionality. In an embodiment, the method 500 starts when the user interface device 102a-c stores user data in a data storage device that is local to a user interface device 102 as shown at block 502. The user interface devices 102a-c may then store a copy of the user data to the continuous image store 112 that is remote from the user interface devices 102a-c as shown at block 504. The continuous image store 112 may performing a service for a user of the user interface device 102a-c using the copy of the user data stored to the continuous image store 112 as shown at block 506. For example, the service may include a malware detection process. Alternatively, the service may include a malware remediation service. In still another embodiment, the service may include a software inventory process. In such embodiments, the continuous image store 112 may communicate information associated with the service back to the user interface device 102a-c as shown at block 508, or to a requesting system administrator or information technology professional supervising recovery of the user interface device 102

Figure 6:
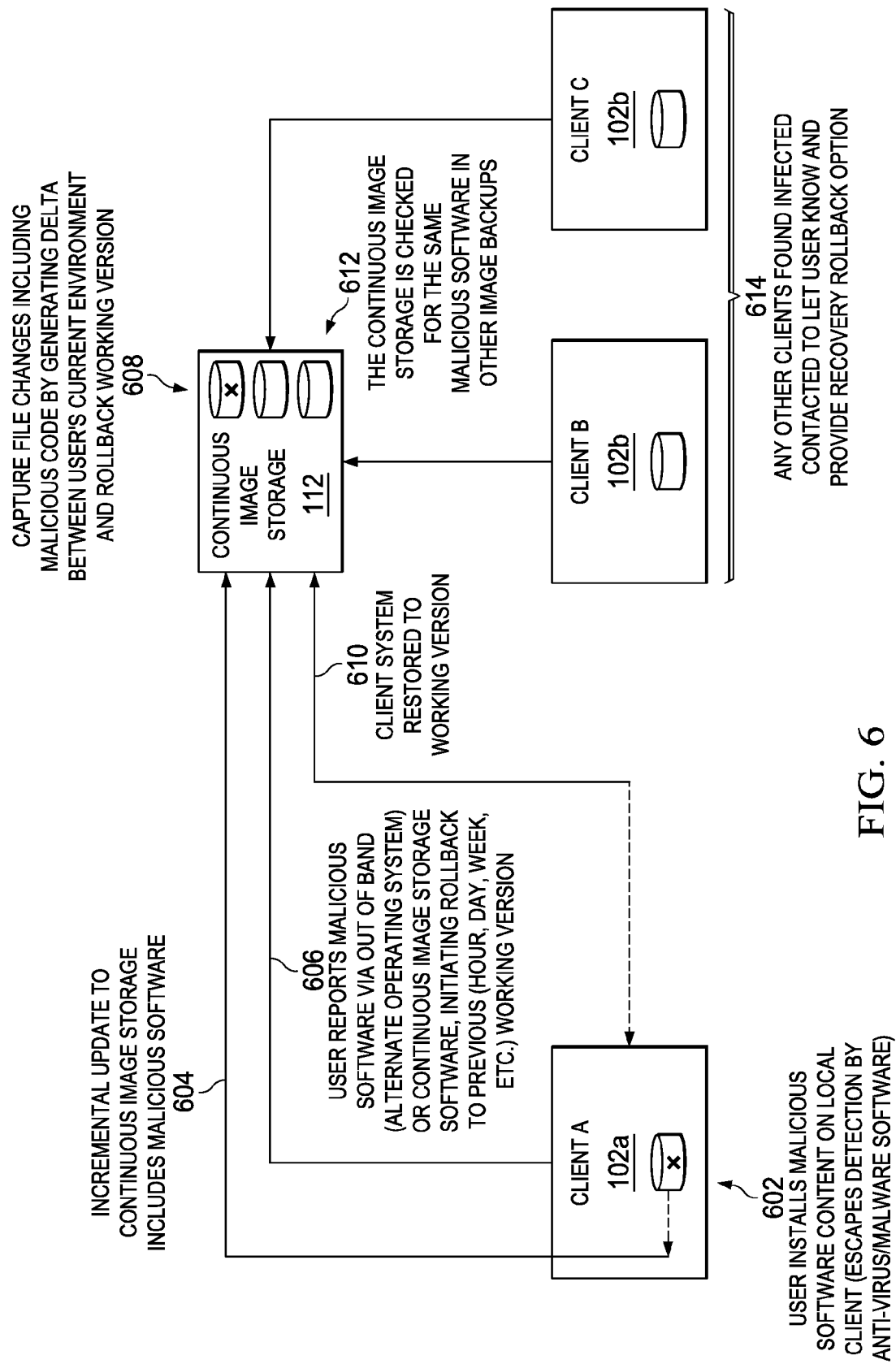
FIG. 6 is a process step chart illustrating an embodiment of a method for asynchronous image repository functionality.

FIG. 6 is a process step chart illustrating an embodiment of a method for asynchronous image repository functionality. This embodiment allows users to self-report malicious software, and in conjunction with a continuous image protection system, be able to self-recover from the incident. Additionally, this embodiment provides a mechanism to report the malicious software so that it can be identified and potentially prevented from spreading to other systems that are maintained by the continuous image protection system.

In the embodiment of FIG. 6, a user of user interface device 102a inadvertently installs malicious software that remains undetected by installed anti-virus/malware software as shown at step 602. At step 604, the user interface device 102a makes an incremental updated to the continuous image store 112. The incremental update may include the malicious software. The user notices a problem with system performance of the user interface device 102a. The user may then self-report the problem either via out of band means (alternate operating system 212b if system is too corrupted/compromised to support the native environment) or via the Continuous Image Store software interface as shown at step 606. The user initiates a rollback to a previous working version of their image (hour, day, week, etc. ago). The user data on the continuous image store may be checked for malicious software and for potential solutions as shown at block 608. For example a delta of the files from the damaged environment may be performed with the requested roll back version and the malicious code file changes are captured. The user interface device 102a is restored to its former working state/version at this point as shown at step 610. Using the captured malicious code file delta, the Continuous Image Store can now be checked to see if any other client images include the same malicious software that was reported and installed on user interface device 102a as shown at step 612. Any other clients found confirmed with the malicious software can be contacted to let their user know and provide a recovery rollback option, or an auto-recovery initiated for the user to remove the malicious software from the client as shown at step 614.

Figure 7:
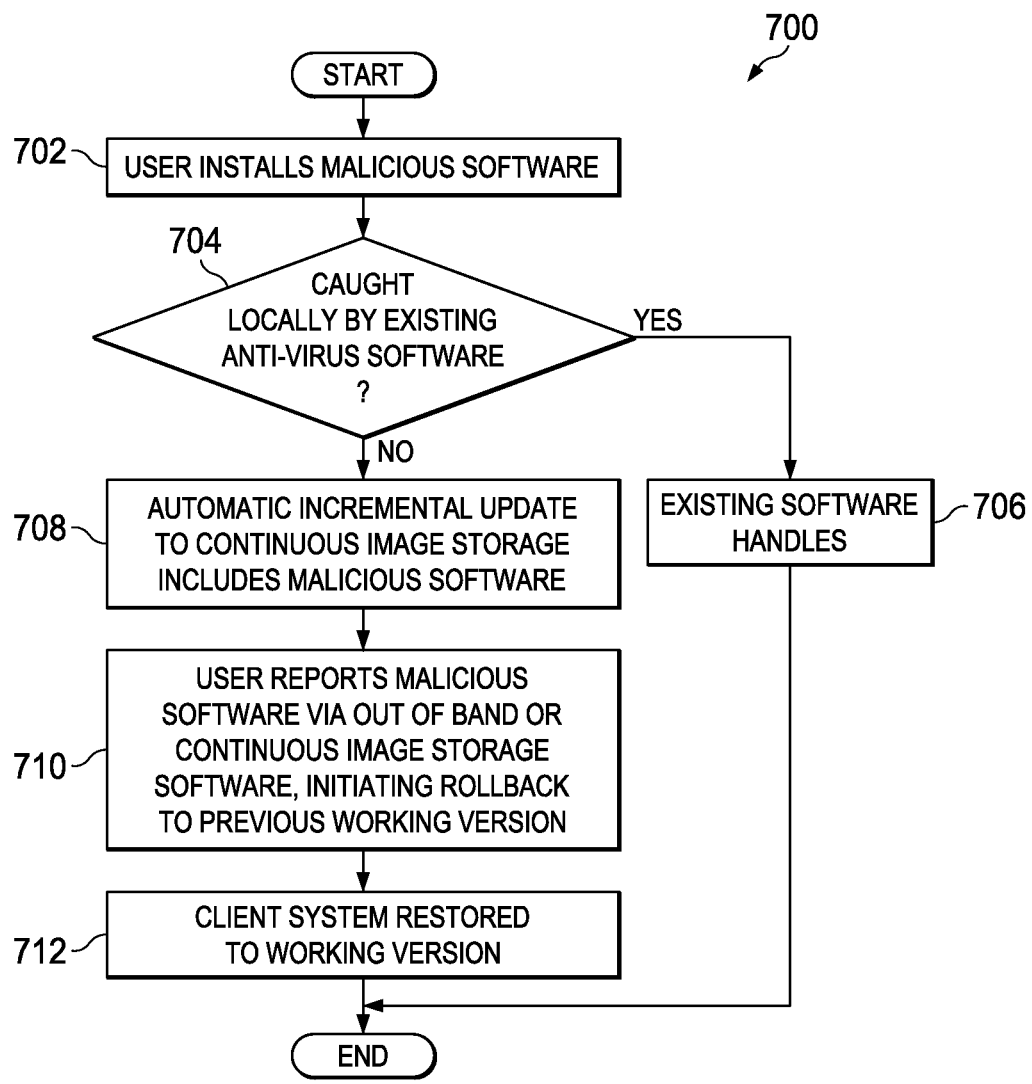
FIG. 7 is a flowchart diagram illustrating an embodiment of a client-side process for asynchronous image repository functionality.

FIG. 7 is a flowchart diagram illustrating an embodiment of a client-side process 700 for asynchronous image repository functionality. In an embodiment, the user interface device 102a is the client. A user of the user interface device 102a may inadvertently install malicious software as shown at block 702. If, as shown at block 704, the user interface device 102*a* catches the malicious software install with local anti-virus software, then the existing local anti-virus software may handle the issue as shown at block 706. Alternatively, if the local anti-virus does not detect the malicious software, an automatic incremental update to the continuous image store 112, which includes the malicious software, may occur as shown at block 708. At block 710, the user may report the malicious software via an out of band channel to the continuous image store 112, or the issue may be reported via an interface with the continuous image store software. The report may initiate rollback to previous working versions. As shown at block 712, the client system may be restored to a working version.

Figure 8:
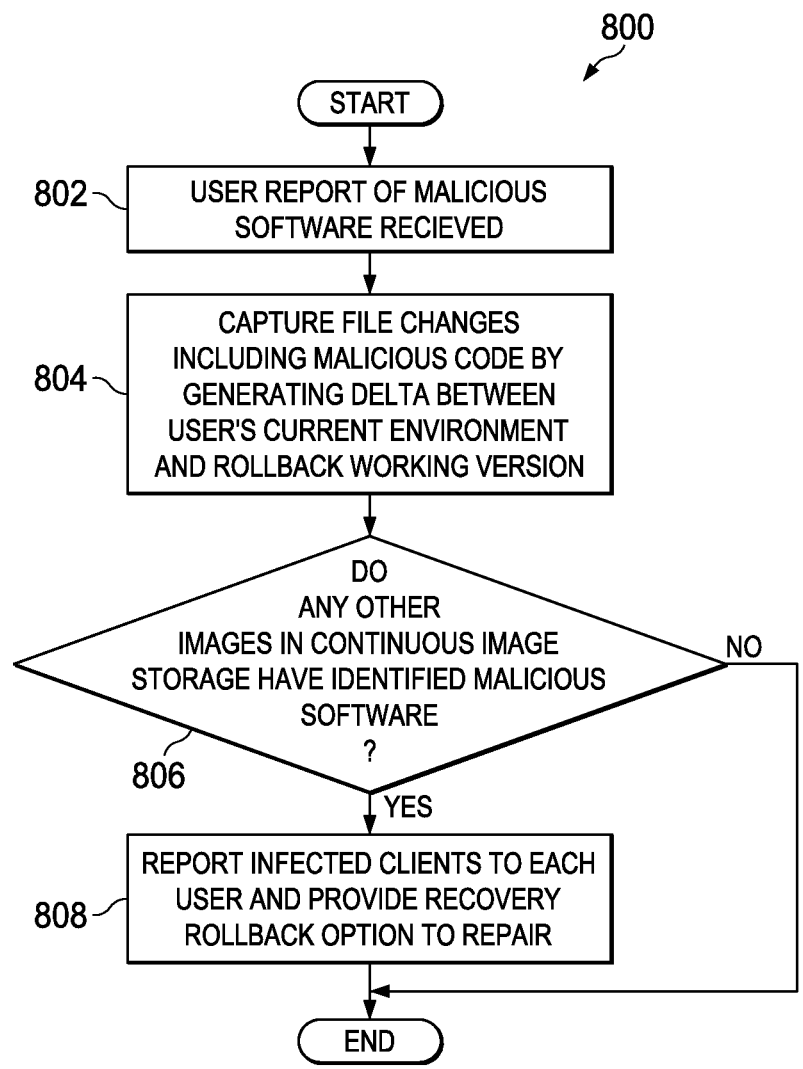
FIG. 8 is a flowchart diagram illustrating a server side process for asynchronous image repository functionality.

On the server side of the continuous image store 112, as illustrated in FIG. 8, the continuous image store 112 may receive the report of the malicious software from the user of the user interface device 102*a* as shown at block 802. At block 804, the continuous image store 112 may capture file changes that included the malicious code by generating a delta between user's current data environment and previous environments. As shown at block 806, the continuous image store 112 may determine whether any other images in the continuous image store contain the identified malicious software. If found, the continuous image store 112 may report to the infected clients and/or associated system administrator or information technology professional, and provide a recover rollback option to the user for repairing the user interface devices 102*b-c*.

Figure 9:
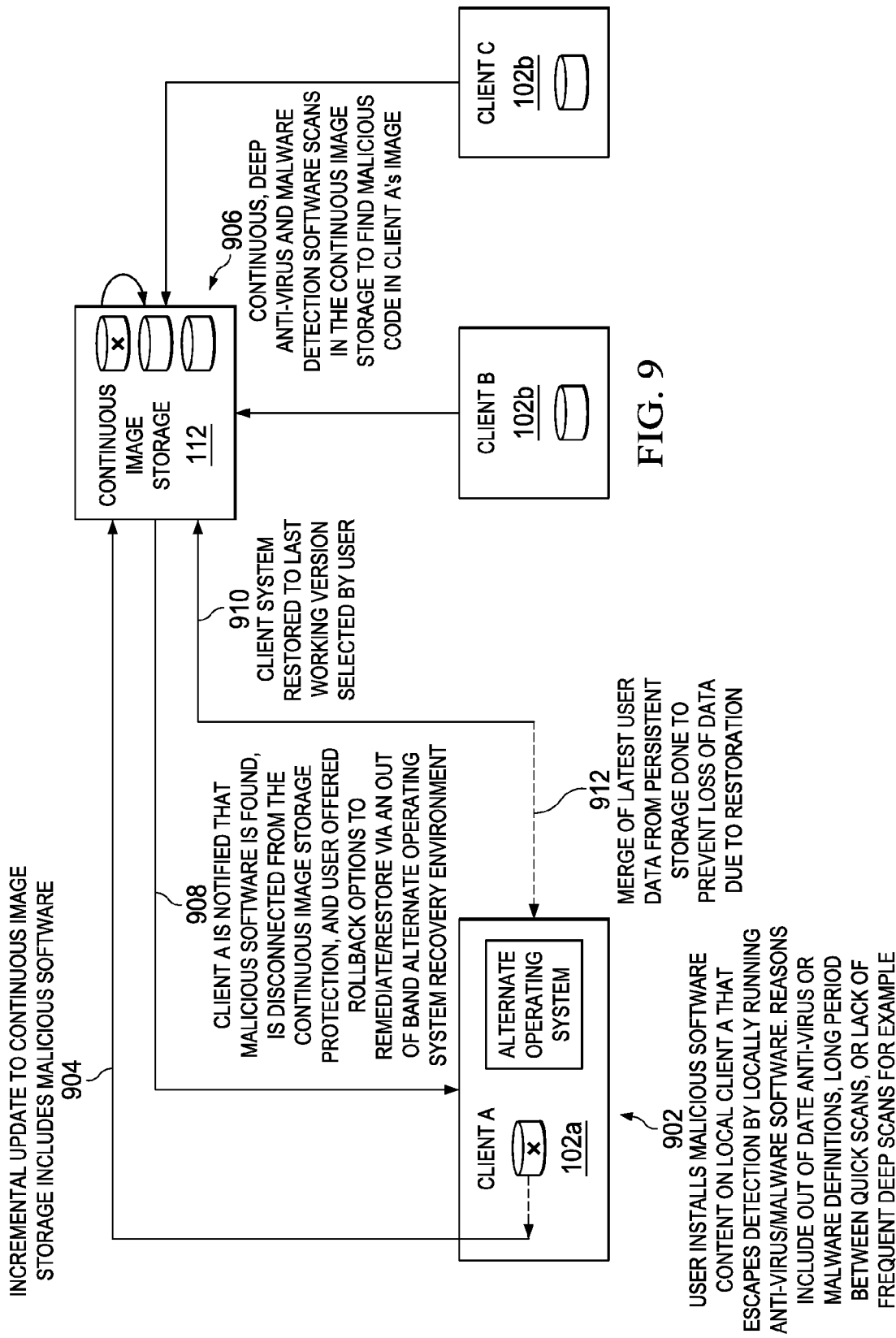
FIG. 9 is a process step chart illustrating an embodiment of a method for asynchronous image repository functionality.

FIG. 9 is a process step chart illustrating another embodiment of a method for asynchronous image repository functionality. This embodiment utilizes a continuous image protection process to provide continuous and deep anti-virus and malware protection scans on the continuous image store providing much more thorough coverage to client computer systems. It also provides the ability to auto-disconnect infected systems upon detecting malicious software in the image repository, and provides an out of band recovery path to allow the user to self-recover from the incident by rolling back to a previously working version of their environment.

For example, at step 902, a user installs malicious software on the user interface device 102*a* that remains undetected by installed anti-virus/malware software run locally user interface device 102*a*. This often occurs on the client side due to out of date anti-virus or malware definitions, long periods between quick scans, and lack of frequent deep scans on the client side.

At step 904, the malicious software is incrementally updated to the Continuous Image Store 112. In an embodiment, anti-virus or malware protection software is run on the Continuous Image Store 112 to provide a continuous deep scan of all data being incrementally updated in the Continuous Image Store 112 as shown at step 906. Anti-virus and malware detection software can be run continuously here, be updated quicker, and cover more data than may be possible in each individual user interface device 102*a-c*, thereby providing a way to potentially catch malicious software quicker, before spreading throughout other user interface devices 102*b-c*.

When malicious software is detected in the Continuous Image Store 112, all infected systems can be identified and the user interface devices 102*a-c* are notified to disconnect and remediate via the use of an out of band environment (alternate operating system 212*b*, potentially Linux based to provide a known safe recovery environment) as shown at step 908. In one embodiment, each user interface device 102*a-c* may include a software client or agent that is installed and configured to handle communications with the continuous image store 112. The client software may be configured to provide the incremental updates and also receive the out of band communications. The user interface device 102*a-c* is notified via the client software or out of band environment that a malicious software issue has been detected, and is provided with options to roll back to a previous working version of their image (hour, day, week, etc. ago). The user interface device 102*a* may be restored to its former working state/version as shown at steps 910. Once user interface device 102*a* is restored, the latest data from persistent storage can be re-merged into the last version of the image used for restore to maintain the user's data as show at step 912. Persistent storage is a local, persistent cache of the user's most recently used files.

Figure 10:
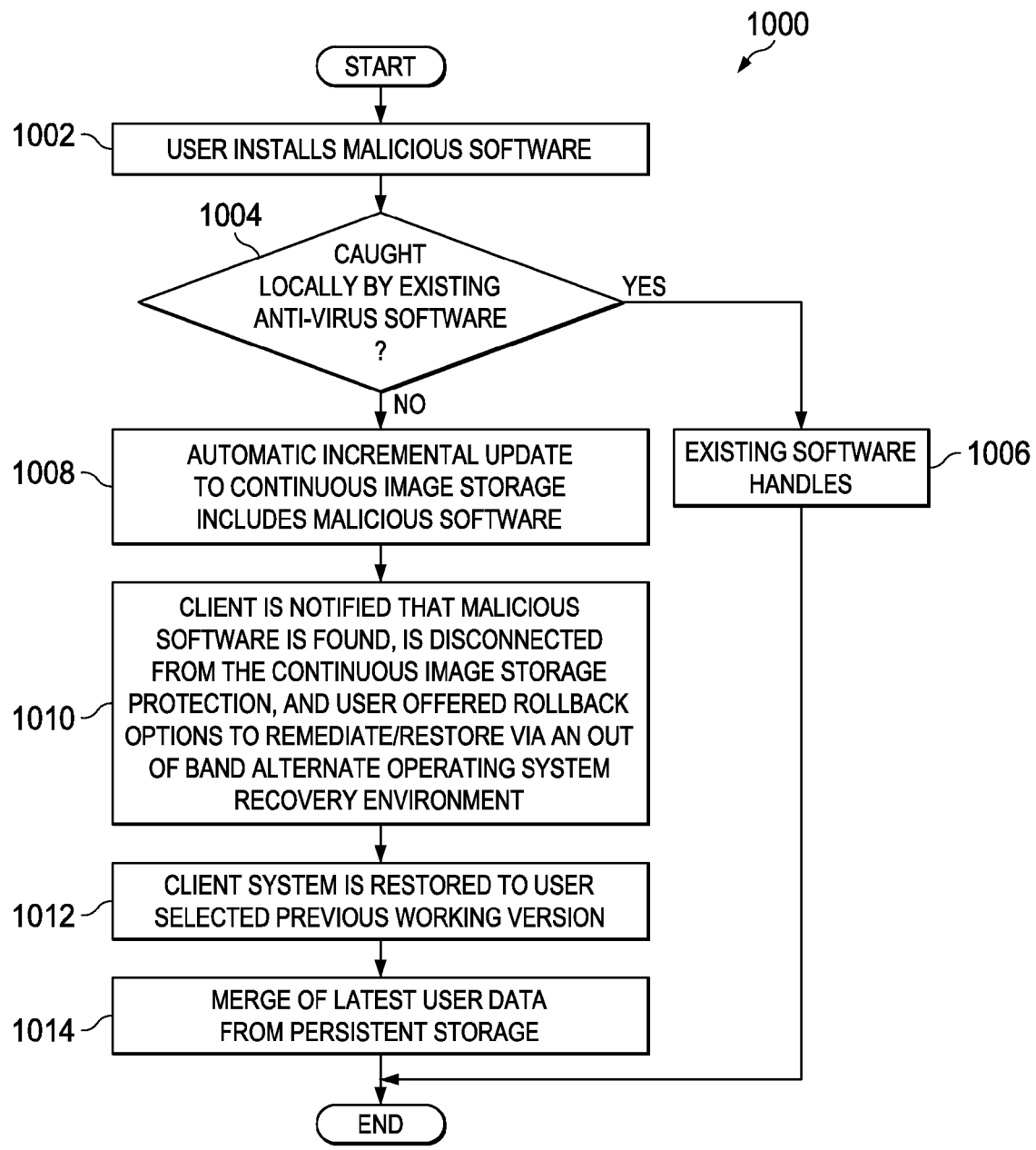
FIG. 10 is a flowchart diagram illustrating an embodiment of a client-side process for asynchronous image repository functionality.

FIG. 10 is a flowchart diagram illustrating an embodiment of a client-side process 1000 for asynchronous image repository functionality. In an embodiment, the client-side process 1000 may be carried out, at least in part, by the client or agent software installed on the user interface devices 102*a-c*. The process 1000 starts when a user of the user interface device inadvertently installs malicious software on the user interface device 102*a* as shown at block 1002. At block 1004, if the malicious software is identified by the local anti-virus software on the user interface device 102*a*, then the anti-virus software may handle remediation of the infection directly, as shown at block 1006. Alternatively, an automatic incremental update to the continuous image store 112, which includes the malicious software, may be made as shown at block 1008. Upon identification of the malicious software in the continuous image store 112, the user interface device 102*a* may be notified that malicious software was found as shown at block 1010. Additionally, the user interface device 102*a* may be disconnected from the continuous image store 112 and the user is offered roll back options to remediate or restore via an out of band connection. In an embodiment, the alternate operating system 212*b* may handle the system remediation process. The user interface device 102*a* may then be restored to a previous working version as shown at block 1012. Finally, at block 1014, any updated to user data in the persistent data storage 208 may be merged with the restore data as shown at block 1014.

Figure 11:
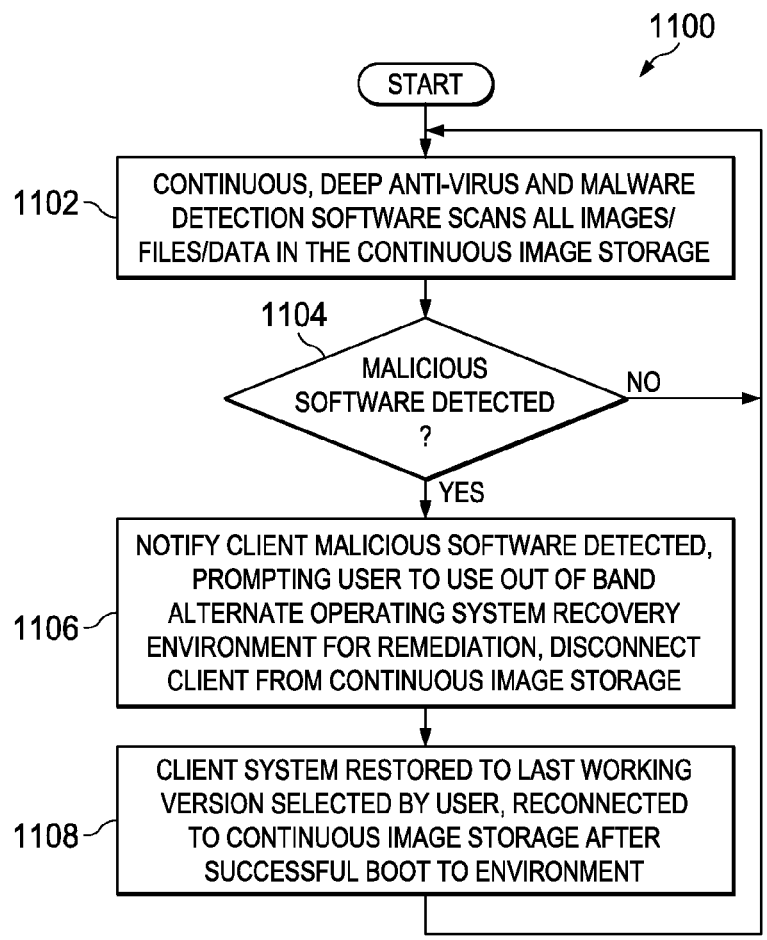
FIG. 11 is a flowchart diagram illustrating a server side process for asynchronous image repository functionality.

FIG. 11 is a flowchart diagram illustrating a server side process 1100 for asynchronous image repository functionality. In an embodiment, the server side process 1100 is carried out by the continuous image store 112. The process 1100 starts when the continuous image store 112 performs a continuous, deep anti-virus and malware detection scan of data in the continuous image store as shown at block 1102. If malicious software is not detected at block 1104, then the continuous scan continues. If malicious software is detected at block 1104, then the continuous image store 112 notifies the user interface 112*a* of the malicious software being detected as shown at block 1106. The continuous image store 112 may further prompt the user to use out of band recovery and the alternate operating system 212*b* to handle recovery or remediation. The user interface 102*a* may also be disconnected from the continuous image store 112 as shown at block 1106. The user interface device 112*a* may then restore to a previous working version as selected by a user, and reconnect to the continuous image store 112 after successful remediation.

Figure 12:
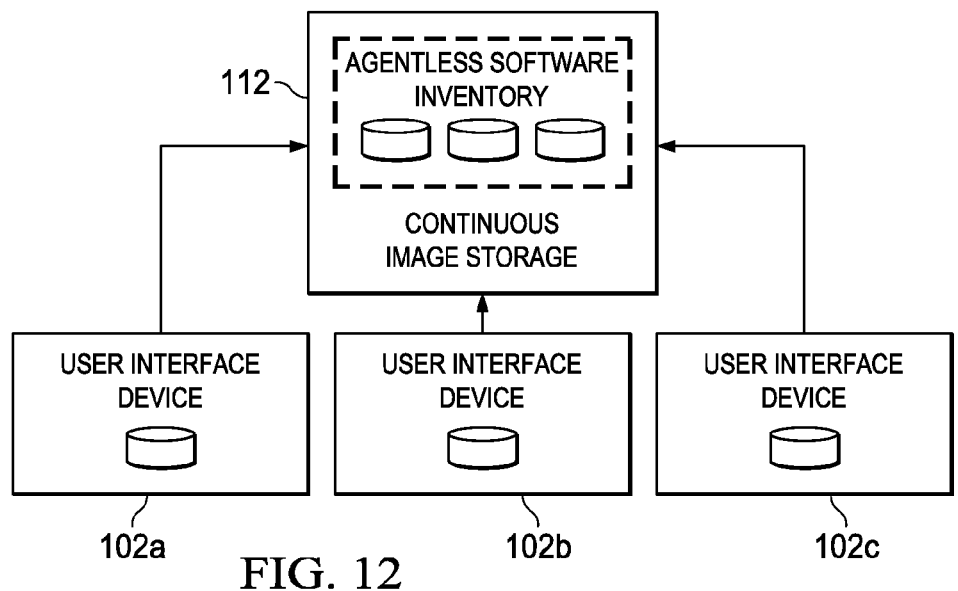
FIG. 12 is a block diagram illustrating another embodiment of a system for asynchronous image repository functionality.

FIG. 12 is a block diagram illustrating another embodiment of a system for asynchronous image repository functionality.

In this embodiment, the service provided by the continuous image store involves inspecting or "mining" software installation use data out of the multitude of client images that are stored in the Continuous Image store 112. FIG. 12 shows the topology of an embodiment of a deployment with the Continuous Image Store 112. The continuous image store 112 may be embodied as either a private cloud or a public cloud service. This image store 112 may contain an up to date capture of the images from all the registered clients, such as user interface devices 102a-c. This includes all the bits that are on the hard drives of the endpoint clients. Because these images are already captured by the continuous image store, no inventory agents, management agents or management APIs are required on the endpoints devices 102a-c to accomplish an agentless software inventory.

Figure 13:
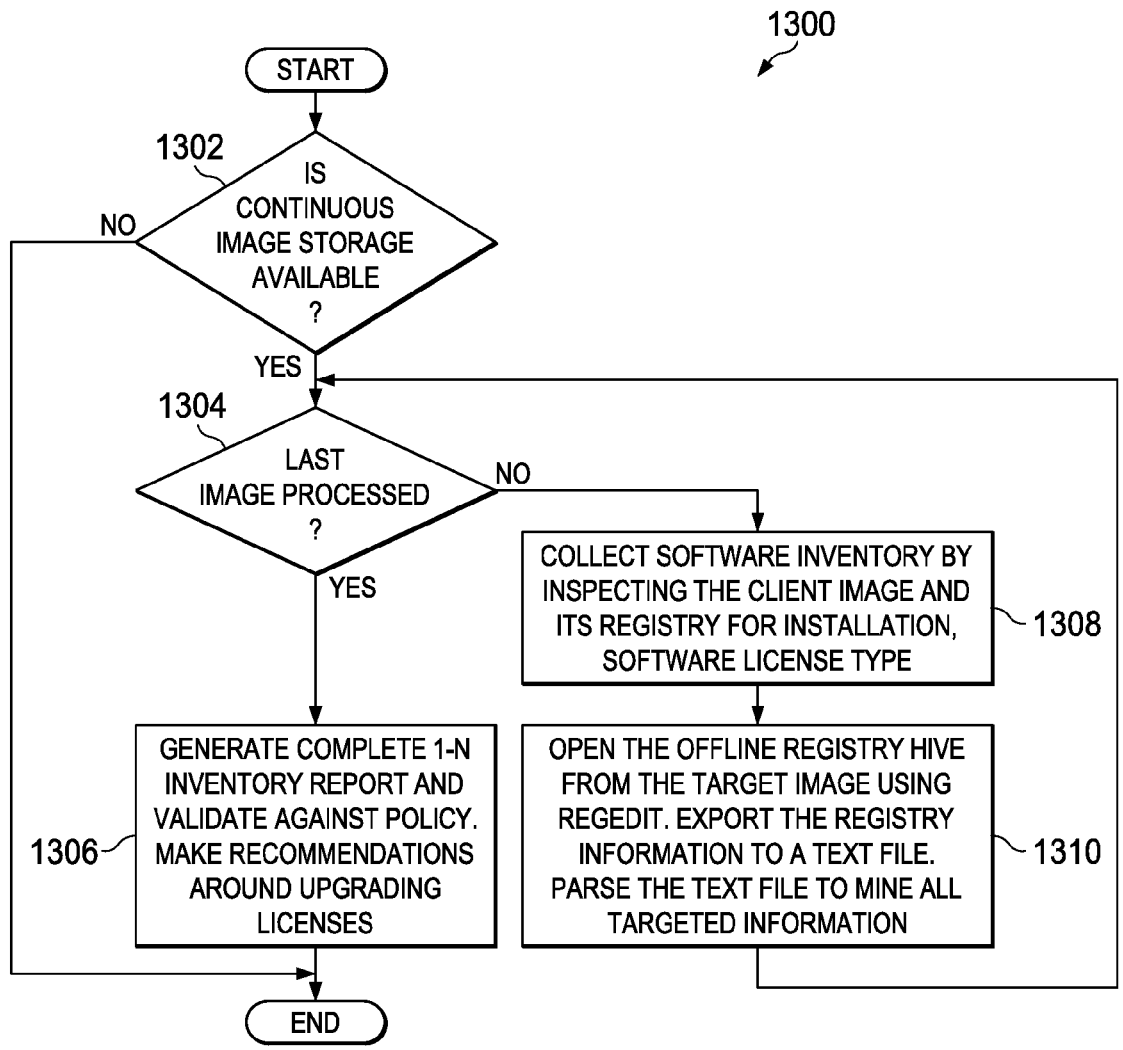
FIG. 13 is a flowchart diagram illustrating another embodiment of a method for asynchronous image repository functionality.

FIG. 13 is a flowchart diagram illustrating another embodiment of a method 1300 for asynchronous image repository functionality. The method 1300 facilitates taking a complete software inventory of the user interface devices 102a-c. This process can be controlled to look for specific software or all the software on the end nodes including any unique software installed by the end user. This may be accomplished by examining the registry hive of each target image stored in the continuous image store 112 by opening it as an offline registry with the regedit command and exporting to a text file and parsing it. After all the images are processed, a report may be generated with the software package statistics and installation usage. Recommendations may be suggested concerning converting to multi-seat licensing or volume licensing can be made from the installation data. Additionally, the user interface devices 102a-c do not have to be powered on or connected to a network to complete a software inventory. The software inventory process can be run asynchronously in the background to any end client activity.

It is also noted that this "mining" functionality of the client images on the Continuous Image Store is extendable beyond just taking a basic software inventory. Additional embodiments may include verifying end user installed applications are acceptable to corporate use policies. In another embodiment, the service may include inspection of appropriate user browser history. Additionally, the service could include collection of contact information to form a corporate contact database. The service may also include indexing of documents for corporate searching and business intelligence. In an embodiment, the service may also include identification of documents to be retained for legal compliance. Beneficially, this solution runs completely out of band to the clients and requires no interaction from the clients to complete. There may not be any additional client agents or system management infrastructure requirements for implementation of such embodiments, once the infrastructure for updating the continuous image store is established.

In an embodiment, the method 1300 of FIG. 13 starts by determining whether a continuous image store 112 is available as shown at block 1302. If not, the method 1300 ends. If so, the continuous image store 112 determines whether a last image has been processed as shown at block 1304. If not, then the continuous image store collects software inventory by inspecting the client image and its registry for software installation information and software license types as shown at block 1308. The continuous image store 112 may then open an offline registry hive from the target user interface device 102a as shown at block 1310. In an embodiment, this may be accomplished with tools such as regedit. The registry information may be exported to a text file in an embodiment. The text file may be parsed to mine all targeted information, such as license information or usage information.

If, at block 1304, it is determined that the last image has been processed, then the continuous image store 112 may generate an inventory report as shown at block 1306. The inventory report may be validated against a license or usage policy, in one embodiment. Additionally, the continuous image store 112 may make recommendations concerning upgrading licenses, restricting software or network access, etc.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   storing user data in a data storage device that is local to a user interface device as a local image;
   storing a copy of the user data to a storage location that is remote from the user interface device as a remote image;
   identifying a performance problem with a current version of the local image due to operation of an undetected malicious software in the user interface device;
   reporting the performance problem to a storage location;
   initiating a rollback of the user interface device from the current version of the local image to a previous working version of the local image using a corresponding previous working version of the remote image stored in the storage location, the storage location comprising one or more Information Handling Systems (IHSs) in data communication with the user interface device, the storage location configured to:
  detect a delta of files between a current version of the remote image corresponding to the current version of the local image and the previous working version of the remote image;
  use the delta to check another remote image of another user interface device; and
  perform, by the IHSs, an inventory service upon the user interface device, wherein the user interface device excludes any inventory agent, and wherein the inventory service is configured to inspect the remote image stored in the storage location, open an offline registry associated with the remote image, export contents of the offline registry to a file, and parse the file to find targeted information stored in the user interface device; and
providing, based upon licensing information examined during the inventory service, a recommendation for converting a software license into a multi-seat or volume license.

2. The method of claim 1, wherein the inventory service comprises indexing of documents for searching across a plurality of user interface devices.

3. The method of claim 1, further comprising identifying the undetected malicious software installed on the user interface device using the delta.

4. The method of claim 3, further comprising notifying the user interface device that malicious software has been installed on the user interface device.

5. The method of claim 3, further comprising facilitating removal or remediation of an infection of malicious software on the user interface device from the copy of the user data stored to the one or more IHSs.

6. The method of claim 1, wherein the delta comprises includes malicious code file changes.

7. The method of claim 1, further comprising notifying the other user interface device to disconnect from the one or more IHSs and to remediate via the use of an out-of-band environment.

8. A user interface device, comprising:
a processor; and
a memory coupled to the processor, the memory comprising program instructions stored thereon that, upon execution by the processor, cause the user interface device to:
  store user data in a data storage device that is local to the user interface device as a local image;
  store a copy of the user data to a storage location that is remote from the user interface device as a remote image;
  identify a performance problem with a current version of the local image due to operation of an undetected malicious software in the user interface device;
  report the performance problem to a storage location;
  initiate a rollback of the user interface device from the current version of the local image to a previous working version of the local image using a corresponding previous working version of the remote image stored in the storage location, the storage location comprising one or more Information Handling Systems (IHSs) in data communication with the user interface device, the storage location configured to:
    detect a delta of files between a current version of the remote image corresponding to the current version of the local image and the previous working version of the remote image;
    use the delta to check another remote image of another user interface device; and
    perform, by the IHSs, an inventory service upon the user interface device, wherein the user interface device excludes any inventory agent, and wherein the inventory service is configured to inspect the remote image stored in the storage location, open an offline registry associated with the remote image, export contents of the offline registry to a file, and parse the file to find targeted information stored in the user interface device; and
  provide, based upon licensing information examined during the inventory service, a recommendation for converting a software license into a multi-seat or volume license.

9. A system, comprising:
a user interface device configured to:
  store user data in a data storage device that is local to the user interface device as a local image;
  store a copy of the user data to a storage location that is remote from the user interface device as a remote image;
  identify a performance problem with a current version of the local image due to operation of an undetected malicious software in the user interface device;
  report the performance problem to a storage location;
  initiate a rollback of the user interface device from the current version of the local image to a previous working version of the local image using a corresponding previous working version of the remote image stored in the storage location, the storage location comprising one or more Information Handling Systems (IHSs) in data communication with the user interface device, the storage location configured to:
    detect a delta of files between a current version of the remote image corresponding to the current version of the local image and the previous working version of the remote image;
    use the delta to check another remote image of another user interface device; and
    perform, by the IHSs, an inventory service upon the user interface device, wherein the user interface device excludes any inventory agent, and wherein the inventory service is configured to inspect the remote image stored in the storage location, open an offline registry associated with the remote image, export contents of the offline registry to a file, and parse the file to find targeted information stored in the user interface device; and
  provide, based upon licensing information examined during the inventory service, a recommendation for converting a software license into a multi-seat or volume license.

10. The system of claim 9, wherein the inventory service is configured to centrally analyze software installed on the user interface device and to provide information regarding compliance with software licenses or policies.

11. The system of claim 9, wherein the inventory service comprises centralized inspection of user browser history.

12. The system of claim 9, wherein the inventory service comprises centralized identification of documents to be retained for legal compliance.

13. The system of claim 9, wherein the inventory service comprises centralized indexing of documents for searching across a plurality of user interface devices.

14. The system of claim 9, wherein the storage location is further configure to identify the undetected malicious software installed on the user interface device using the delta.

15. The system of claim 14, wherein the storage location is further configured to notify the user interface device that malicious software has been installed on the user interface device.

16. The system of claim 14, wherein the storage location is further configured to facilitate removal or remediation of an infection of malicious software on the user interface device from the copy of the user data stored to the storage location.

17. The system of claim 9, wherein the delta includes malicious code file changes.

18. The system of claim 9, wherein the storage location is further configured to notify the other user interface device to disconnect from the storage location and to remediate via the use of an out-of-band environment.

\* \* \* \* \*

UNITED STATES PATENT AND TRADEMARK OFFICE
CERTIFICATE OF CORRECTION

PATENT NO. : 9,734,191 B2  Page 1 of 1
APPLICATION NO. : 14/231678
DATED : August 15, 2017
INVENTOR(S) : Swierk et al.

It is certified that error appears in the above-identified patent and that said Letters Patent is hereby corrected as shown below:

In the Claims

In Column 13, Line 37, Claim 6, delete "includes".

Signed and Sealed this
Third Day of October, 2017

Joseph Matal
*Performing the Functions and Duties of the*
*Under Secretary of Commerce for Intellectual Property and*
*Director of the United States Patent and Trademark Office*